UNITED STATES PATENT OFFICE.

THOMAS HILL EASTERFIELD AND CLARA MILLICENT TAYLOR, OF WELLINGTON, NEW ZEALAND.

PROCESS FOR THE PREPARATION OF KETONES.

1,058,225.

No Drawing.

Specification of Letters Patent.  Patented Apr. 8, 1913.

Application filed April 6, 1911. Serial No. 619,425.

*To all whom it may concern:*

Be it known that we, THOMAS HILL EASTERFIELD and CLARA MILLICENT TAYLOR, citizens of the Dominion of New Zealand, and residents of Wellington, in the Provincial District of Wellington, in the Dominion of New Zealand, have invented certain new and useful Improvements in Processes for the Preparation of Ketones, of which the following is a specification.

The ketones of the higher fatty acids are usually prepared by heating the calcium or barium salts of these acids in small portions to a high temperature.

Stearic acid heated alone distils for the most part unchanged but some stearone is formed during the process. It is also known that when stearic acid is distilled with magnesium powder *in vacuo* at as low a temperature as possible, liquid and solid hydrocarbons result together with stearone and it has been surmised that since easily oxidized metals in general yield similar hydrocarbons when heated with stearic acid the production of these hydrocarbons is also due to the preliminary formation of stearone. It is also known that the vapors of the lower fatty acids from acetic to nonoic acid yield ketones when passed over zinc dust or reduced iron at a suitable temperature. It has not, however, been known that under suitable conditions, ketones are the chief products of the interaction of the saturated higher fatty acids, with many metals. Nor can we find any record that a higher yield of stearone than 50% of the theoretical can be by any method obtained from stearic acid. Nor can we find any record of the preparation of the ketone of montanic acid or of the ketones of the higher unsaturated fatty acids such as oleic, elaidic, erucic or brassidic acids.

We have discovered that if the higher saturated fatty acids, for example, palmitic, stearic, montanic, cerotic, and melissic, be heated with cast iron turnings to a temperature which does not attain the temperature of rapid decomposition of the ketone sought and the temperature maintained until the evolution of carbon dioxid becomes slow a large yield of the ketone of the acid employed is produced. For example in the production of commercial stearone we take commercial stearin (commercial stearic acid) and heat it with about one tenth of its weight of cast iron turnings to a temperature of 300° C., and then allow the temperature to rise slowly to about 360° C. at which temperature the melt is maintained so long as carbon dioxid is fully evolved—usually three or four hours. After cooling to purify the product by any of the usual methods for the purification of ketones, such as crystallization from a suitable solvent with or without a decolorizing agent, or distillation with steam or under diminished pressure with or without the previous removal of fatty acid, metal and metallic oxid, the yield of ketone is 80% of the weight of the stearic acid taken. The melting point and purity of the product depend upon the purity of the stearin employed. Pure stearic acid yields practically pure stearone. Commercial stearone thus prepared is, after melting and solidification, a waxy material of high melting point—it is an excellent hardener both for paraffin and stearin candles and can be used as a substitute for natural waxes.

The chief advantages of the process are:—(1.) The yield of ketone is high. (2.) Large quantities can be made in a single operation. (3.) The manufacture proceeds directly from the fatty acids which are in general more easily prepared and handled than their salts. (4.) The contact substance—iron turnings—is cheap. (5.) The plant required for the manufacture is simple.

If unsaturated fatty acids are employed the hitherto undescribed ketones of these acids result, but, as the unsaturated acids and ketones are less stable than the saturated acids and ketones, the yield of the ketones of the unsaturated acids is not so good as in the case of the saturated acids.

In a similar way we have obtained good yields of stearone by substituting the metals aluminium, manganese and zinc in a fine state of division for the iron turnings in the above operation.

Having thus described the invention what is claimed is:

1. A process for preparing a ketone of a higher fatty acid by heating a higher fatty acid with a finely divided metal to a temperature below the temperature of rapid decomposition of the acid employed, until the evolution of carbon dioxid has become very slow.

2. A process for preparing a ketone of a higher fatty acid by heating a higher fatty acid with a finely divided metal to a temperature below the temperature of rapid decomposition (in contact with the metal employed) of the ketone desired, until the evolution of carbon dioxid has become very slow.

3. A process for preparing a ketone of a higher fatty acid by heating a higher fatty acid with finely divided metallic iron to a temperature below the temperature of rapid decomposition of the acid employed, until the evolution of carbon dioxid has become very slow.

4. A process for preparing a ketone of a higher fatty acid by heating a higher fatty acid with finely divided metallic iron to a temperature below the temperature of rapid decomposition (in contact with metallic iron) of the ketone sought, until the evolution of carbon dioxid has become very slow.

5. A process for preparing a ketone of a higher fatty acid by heating a higher fatty acid with metallic iron cuttings to a temperature below the temperature of rapid decomposition of the acid employed, until the evolution of carbon dioxid has become very slow.

6. A process for preparing a ketone of the higher fatty acid by heating a higher fatty acid with metallic iron cuttings to a temperature below the temperature of rapid decomposition (in contact with iron) of the ketone sought, until the evolution of carbon dioxid has become very slow.

7. A process for preparing stearone by heating commercial stearic acid with iron to a suitable temperature.

8. A process for preparing stearone by heating commercial stearic acid with finely divided iron to a temperature below the temperature of rapid decomposition of stearic acid, until the evolution of carbon dioxid has become very slow.

9. A process for preparing stearone by heating commercial stearic acid with finely divided iron to a temperature below the temperature of rapid decomposition (in contact with metallic iron) of stearone, until the evolution of carbon dioxid has become very slow.

10. A process for preparing stearone by heating commercial stearic acid with iron cuttings to a temperature below the temperature of rapid decomposition of stearone until the evolution of carbon dioxid has become very slow.

In testimony whereof, we have signed our names to this specification in the presence of two subscribing witnesses.

THOMAS HILL EASTERFIELD.
CLARA MILLICENT TAYLOR.

Witnesses:
ERNEST SMITH BALDWIN,
ANNIE DOROTHY McKENZIE.